Patented June 3, 1947

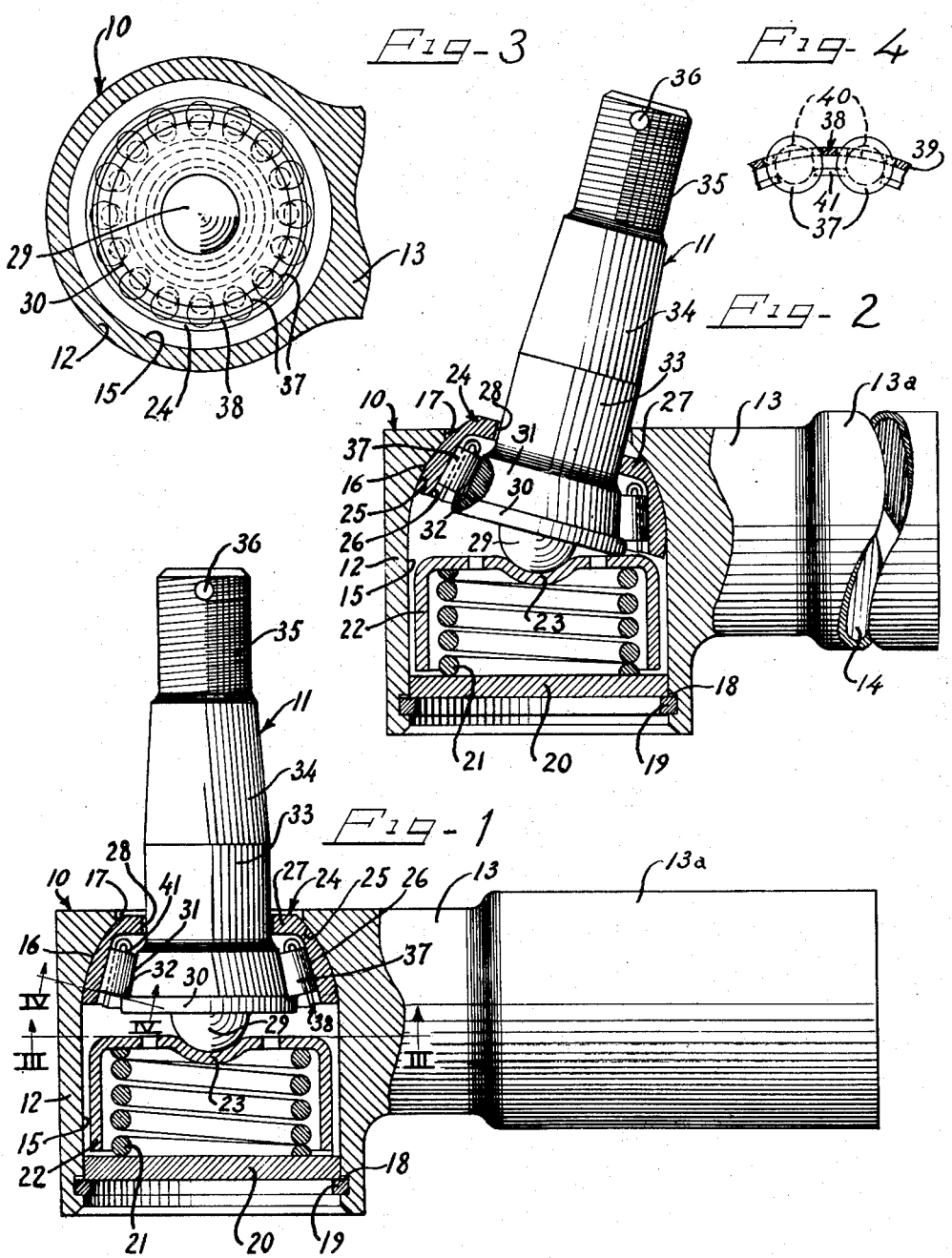

2,421,588

UNITED STATES PATENT OFFICE 2,421,588

JOINT

Anthony Venditty, Detroit, Mich., assignor to Thompson Products, Inc., a corporation of Ohio Application June 2, 1943, Serial No. 489,340

1 Claim. (Cl. 287—90)

This invention relates to joint constructions wherein a joint member is rotatably mounted on anti-friction bearings and tiltably mounted on other bearings.

Specifically the invention relates to tie rod joints having studs rotatably mounted about their own axes on roller bearings and tiltably mounted in all planes on plain bearings wherein the roller bearings are held in position by a shoulder on the stud and wherein tilting movements of the stud are transferred to a plain bearing disposed around the stud through an apertured wall of the bearing.

An object of this invention is to provide an improved joint construction having a universally movable member mounted on anti-friction bearing elements which carry a tiltable mounted bearing.

A further object of the invention is to provide an anti-friction tie rod joint wherein the anti-friction elements cannot work out of operative position.

A still further object of the invention is to provide a joint with a member having a raceway and a shoulder adjacent the raceway to hold anti-friction elements on the raceway.

A further object of the invention is to provide an anti-friction bearing equipped tie rod joint wherein the bearings ride on raceways provided by the joint stud and by a tiltably mounted seat ring and wherein the seat ring has an apertured wall closely surrounding the stud to be abutted by the stud during tilting movements of the stud for transferring such movements to the seat ring.

Other and further objects of the invention will be apparent to those skilled in the art from the following detailed description of the annexed sheet of drawings which, by way of preferred example only, illustrates one embodiment of the invention.

On the drawings:

Figure 1 is a side elevational view, with parts in vertical cross section, of a tie rod joint according to this invention.

Figure 2 is a view similar to Figure 1 illustrating a tilted position of the joint.

Figure 3 is a fragmentary horizontal cross-sectional view taken along the line III—III of Figure 1.

Figure 4 is a fragmentary cross-sectional view of the roller and cage assembly taken along the line IV—IV of Figure 1.

As shown on the drawings:

In Figures 1 and 2 the reference numeral 10 designates generally a socket or housing member of a tie rod joint while the reference numeral 11 designates generally a stud which is tiltably and rotatably mounted in the socket or housing and projects from the housing.

The housing 10 has a generally cylindrical end portion 12 with a laterally extending stem or shank 13 having an enlarged hollow end portion 13a which is internally threaded as at 14 (Figure 2) to be threaded around a tie rod (not shown).

The portion 12 of the housing 10 has a cylindrical bore 15 extending from the bottom end thereof to an inwardly converging segmental spherical bearing wall 16 near the upper end thereof. The bearing wall 16 converges to a circular opening 17 of smaller diameter than the bore 15.

A groove 18 is formed in the bore 15 near the bottom of the housing portion 12 and receives a snap washer or retainer ring 19 therein which projects into the bore and provides a shoulder bottoming a closure disk 20. A spring 21 is mounted on the closure disk 20 and is encased within a retainer cup 22 having a top wall with a depressed central portion 23 providing a segmental spherical socket or dimple.

A hollow seat ring 24 has an outer segmental spherical wall 25 tiltably bearing on the bearing surface 16 of the housing portion 12. This seat member 24 has a frusto-conical inner wall 26 providing an outer raceway.

The seat member 24 in addition has an apertured top wall 27 projecting inwardly from the raceway 26 and having a central circular aperture 28 therethrough.

The stud member 11 has a rounded button end 29 seated in the dimple provided by the depression 23 of the cup 22. An annular flange 30 is formed around the bottom end of a frusto-conical head 31 on the stud to provide a flat shoulder 32 at the large end or base of the frusto-conical head. This frusto-conical head 31 provides an inner raceway.

The stud has a generally cylindrical portion 33 projecting from the small or apex end of the frusto-conical head 31 through the aperture 28 in the seat member. A tapered portion 34 extends from the cylindrical portion 33 of the stud and is adapted to receive the eye end of a steering arm or other link member (not shown) therearound. The upper end of the stud has a cylindrical externally threaded portion 35 adapted to receive a nut (not shown) therearound. A cotter pin hole 36 is provided through the stud adjacent the upper end.

In accordance with this invention a ring of tapered roller bearings 37 is disposed between the stud head 31 and the seat member 24 to ride on the inner raceway provided by the stud head 31 and in the outer raceway 26 of the seat member 24. The roller bearings 37, and inner and outer raceways on which they ride, all converge in the direction of convergence of the bearing walls 16 and 25, viz., toward the opening 17 in the housing portion 12.

Each roller bearing 37 is bottomed on the shoulder 32 provided by the flange 30. The roller bearings 37 are rotatably mounted in spaced relation in a cage 38 which is, as shown in Figure 4, an annular band 39 of metal having apertures 40 therethrough of less width than the major diameter of the rollers 37 so that the rollers cannot be moved outwardly from the band. In order to hold the rollers from dropping inwardly from the band, the top edge of the band has downturned tangs 41 extending between the rollers 37 inwardly of their major diameters. The rollers in moving inwardly from the band 39, will thus be abutted by the tangs 41 which effectively prevent them from dropping out of the band.

In operation, of course, the rollers 37 ride only on the inner and outer raceways provided by the stud head 31 and bearing wall 26 of the seat member 24. The cage 38 is effective merely to hold the rollers in equally spaced relation around the raceways.

The stud member 11 is freely rotatable about its own axis on the roller bearings 37 and is tiltable in any plane on the segmental spherical bearing surfaces of the seat member and housing. When the stud 11 is tilted, as shown in Figure 2, the cylindrical portion 33 thereof abuts the seat wall 27 to transmit the tilting movements to the seat member 24 thereby causing the seat member to move as a unit with the stud. The aperture 28 in the wall 27 is only slightly larger than the portion 33 of the stud to provide operating clearance for rotation of the stud about its own axis. As soon as the stud is tilted it thrusts against the wall 27 thereby preventing cocking of the stud and roller bearings in the seat member.

The spring 21 continually urges the cup member 22 in the direction of convergence of all bearing surfaces of the assembly and thereby serves to take up any wear developed between these bearing surfaces thus preventing the joint parts from becoming loose. The ball or button end 29 on the stud 11 is readily tiltable in the dimple provided by the depressed portion 23 of the retainer 22.

Since the spring 21 acts through the cup 22 on the stud, urging the stud in the direction of convergence of all bearing surfaces, there is a tendency for the roller bearings 37 to work downwardly or to be squeezed out from between the inner and outer raceways. This action is effectively resisted, however, by the shoulder 32 on the stud.

Because the rollers 37 taper toward the seat wall 27, the squeezing-out action is always in a direction away from the wall 27.

The roller bearings 37 not only rotatably support the stud 11 in the seat 24, but also serve as thrust bearings to hold the seat and stud in operative relation. A thrust load is always maintained on the bearing assembly since the spring 21 is under compression and acts on the roller bearings through the shoulder 32 of the stud.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A tie rod joint comprising a socket member having an inner converging bearing surface accommodating tilting movements, a hollow seat ring tiltably mounted on said bearing surface, said seat ring having an apertured end wall and a tapered inner surface converging in the same general direction as the socket member bearing surface, a stud having a shank with a cylindrical surface projecting through the aperture in said end wall of said seat ring in close running clearance relation therewith, said stud having a head with a tapered surface disposed in the seat ring and converging in the same general direction as the socket member bearing surface, tapered roller bearings between the seat ring and head riding on the tapered surfaces thereof, a shoulder on said head of the stud bottoming the large ends of said tapered roller bearings and effective to hold the bearings in proper relation to said tapered surfaces of the head and seat ring, and a spring means urging said shoulder against the roller bearings, said roller bearings acting on the opposed tapered surfaces of the seat ring and stud head to restore the close running clearance relation between the cylindrical surface of the stud shank and the end wall of the seat ring upon cessation of tilting movement of the stud.

ANTHONY VENDITTY.

REFERENCES CITED

The following references are of record in the file of this patent:

UNITED STATES PATENTS

| Number | Name | Date |
|---|---|---|
| 2,074,748 | Hufferd et al. | Mar. 23, 1937 |
| 1,959,563 | Baker | May 22, 1934 |
| 1,948,757 | Harris | Feb. 27, 1934 |
| 1,983,947 | Rockwell | Dec. 11, 1934 |
| 2,122,655 | Niles | July 5, 1938 |